Jan. 7, 1969 W. M. PELGER, SR 3,420,206
RETRIEVE-MARKER
Filed June 20, 1967

INVENTOR.
WILLIAM PELGER SR.

United States Patent Office 3,420,206
Patented Jan. 7, 1969

3,420,206
RETRIEVE-MARKER
William M. Pelger, Sr., 1810 Clarendon Ave. SW.,
Canton, Ohio 44706
Filed June 20, 1967, Ser. No. 647,450
U.S. Cl. 116—124                              3 Claims
Int. Cl. G09f 9/00

ABSTRACT OF THE DISCLOSURE

A retrive or marker secured to a fishing rod any other object accidently sinks into a body of water, float is released in ten to twelve hours and floats to the surface while remaining tied to the object by a length of cord or line, as a result the retrieve marker both marks the location of the sunken object and provides a means for recovering same.

Summary of the invention

In my invention float is secured to base with water dissolvable adhesive or any bonding material and the base is fastened to object with screws or clamps depending on size and shape of object. Spring interposed between the float and the base causes forceful dissengagement therebetween when the object is in the water and the adhesive dissolves. Cord interposed between float and base can be of various lengths one end tide to the float and the other tied to the base. As a result after the disengagement the float rises to the surface while remaining tied to the base and functions as a retrieve marker as indicated.

Detailed description of preferred embodiment

Figure 1:
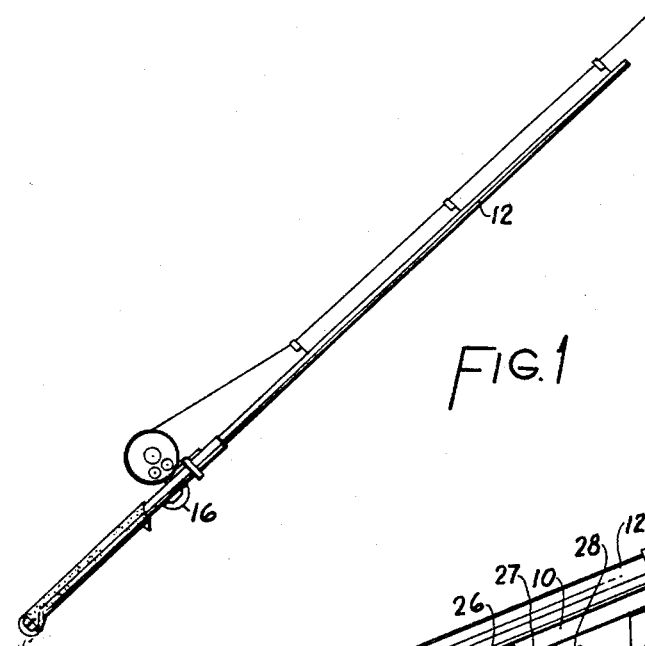
FIG. 1 is a perspective view of my invention in use on a fishing rod.
Figure 2:
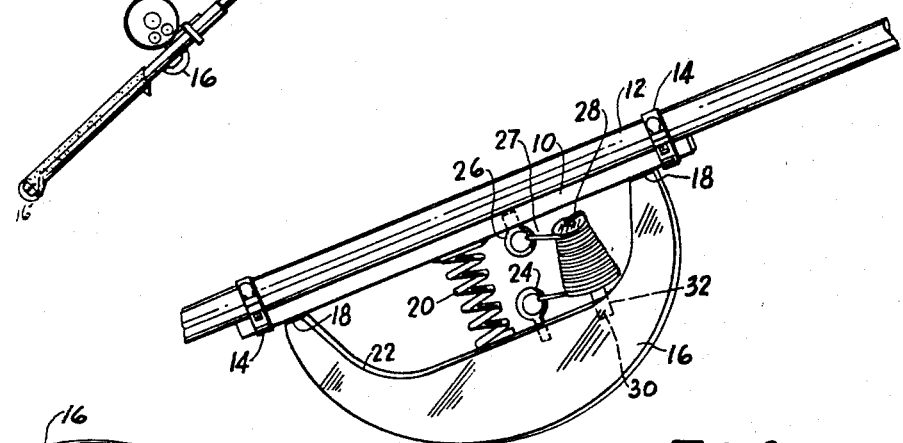
FIG. 2 is a detail view of my invention in secured position.
Figure 3:
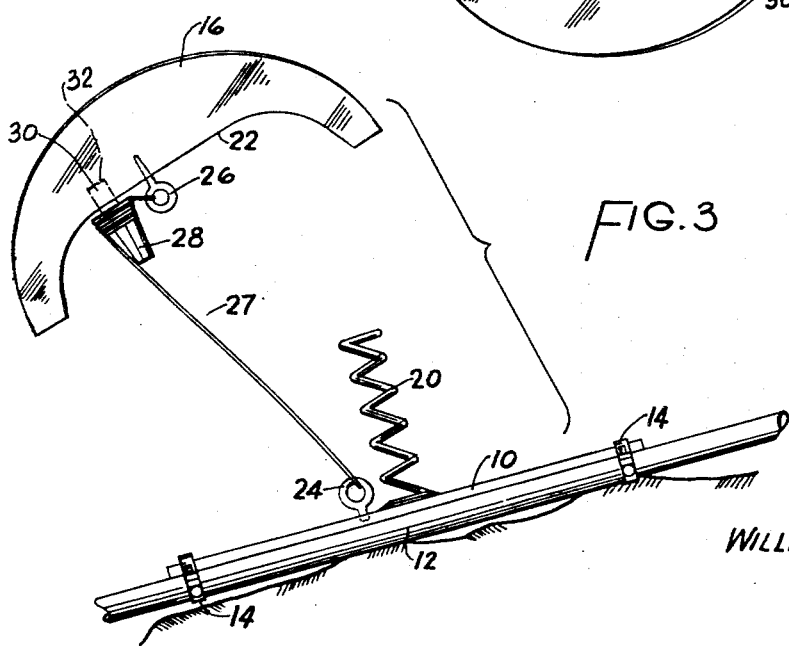
FIG. 3 is a view similar to FIG. 2 but showing my invention in released position.
Figure 4:
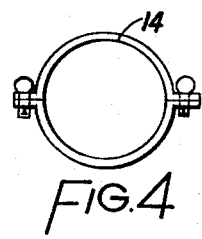
FIG. 4 is a detail view of a clamp used in the showing of FIGS. 1–3.

Referring now to FIGS. 1–4, an elongated bar or other member 10 is detachably secured to fishing rod 12 by clamps 14. A C-shaped float 16, of cork, plastic or other material which floats in water is secured at opposite ends to member 10 by water soluble glue 18 or any bonding material. A coil spring 20 held in compression bears at one end against member 10 and at the other end against the interior surface 22 of the main body of float 16. Surface 22 carries an eye 24. Member 10 carries an oppositely disposed eye 26. A cord 27 is secured at each end to a corresponding one of these eyes and is wound about a bobbin 28 having a prong 30 at one end imbedded into a recess 32 in surface 22.

In use when the rod falls into the water glue dissolves. Spring 20 forces float and rod apart the float moves upward to the surface of the water and the cord unwinds on the bobbin. Where by the retrieve marker function ensues.

The spring can be replaced by a capsule containing gas such as carbon dioxide under pressure, the gas being released when the glue dissolves to disengage float and rod.

The float can be of any shape or size to fit rods, guns, field glasses, cameras, tackleboxes, outboard motors or any other object, whether or not retrievable by hand.

While I have described my invention with particular reference to the drawings, my protection is to be limited only by the terms of the claims which follow.

I claim:
1. A retrieve-marker device for an object dropped into a body of water comprising: a support means adapted to be removably secured to said object, a substantially thin C-shaped float means secured at its free end portions to said support means solely by a water dissoluble adhesive means, biasing means mounted on said support means and interposed between said support means and said float means to disengage said float means from said support means when said object is in water and said adhesive means has dissolved, a bobbin attached to said float means, tether means interposed between said object and said float means including a length of cord wound about said bobbin and secured at one end to said support means and at its other end to said float means whereby when said object sinks in water said float means will disengage from said support means and raise to the surface of the water and remain secured to said object to mark the location of, and provide means for retrieving said object.
2. A retrieve-marker as set forth in claim 1 wherein said biasing means is a coil spring.
3. A retrieve-marker as set forth in claim 2 wherein the adhesive means is a water soluble glue.

References Cited

UNITED STATES PATENTS

| | | | |
|---|---|---|---|
| 1,935,229 | 11/1933 | Neal | 9—9 |
| 3,007,437 | 11/1961 | Adair | 116—124 |
| 3,049,733 | 8/1962 | Menhengo | 9—9 |
| 3,070,818 | 1/1963 | Fairchild. | |
| 3,121,889 | 2/1964 | Gentile | 9—9 |
| 3,334,364 | 8/1967 | Foss et al. | 9—9 |

LOUIS J. CAPOZI, *Primary Examiner.*

U.S. Cl. X.R.

9—9